(12) United States Patent
Rassi et al.

(10) Patent No.: US 6,445,307 B1
(45) Date of Patent: Sep. 3, 2002

(54) DRILL STRING TELEMETRY

(75) Inventors: Dareyoush Rassi; Yuri Zhuravlev, both of Swansea (GB)

(73) Assignee: Cryoton (UK) Limited, Swansea (GB)

( * ) Notice: Subject to any disclaimer, the term of this patent is extended or adjusted under 35 U.S.C. 154(b) by 0 days.

(21) Appl. No.: 09/398,113

(22) Filed: Sep. 16, 1999

(30) Foreign Application Priority Data

Sep. 19, 1998 (GB) ............................................. 9820333

(51) Int. Cl.[7] .................................................. G01V 3/00
(52) U.S. Cl. ............................. 340/854.6; 340/854.8; 343/742; 324/303
(58) Field of Search ........................... 340/854.6, 854.8, 340/853.1; 367/182, 6; 324/303; 343/742, 893

(56) References Cited

U.S. PATENT DOCUMENTS

| | | | |
|---|---|---|---|
| 3,793,632 A | 2/1974 | Still | 367/182 |
| 3,967,201 A | 6/1976 | Rorden | 340/854.5 |
| 5,331,331 A * | 7/1994 | Wu | 324/333 |
| 6,249,259 B1 * | 6/2001 | Goodman et al. | 340/854.6 |
| 6,329,955 B1 * | 12/2001 | McLean et al. | 343/741 |
| 6,348,792 B1 * | 2/2002 | Beard et al. | 324/300 |

FOREIGN PATENT DOCUMENTS

| | | |
|---|---|---|
| EP | 0428180 | 5/1991 |
| SU | 1233077 | 5/1996 |
| WO | 9014497 | 11/1990 |

* cited by examiner

Primary Examiner—Michael Horabik
Assistant Examiner—Albert K. Wong

(57) ABSTRACT

A telemetry transmitter located in a portion of a drill string comprises an input for receiving and transmitting data obtained from at least one transducer arranged to sense a parameter of the drill string and/or a parameter of the surrounding medium. The transmitter comprises a magnetic dipole arranged to transmit an electromagnetic data signal, a current dipole arranged to transmit an electromagnetic data signal and control means for adaptively varying the power output from the magnetic and current dipoles, according to the orientation of the portion of the drill string containing the transmitter and according to the electrical resistivity of the medium surrounding the portion of the drill string containing the transmitter.

19 Claims, 6 Drawing Sheets

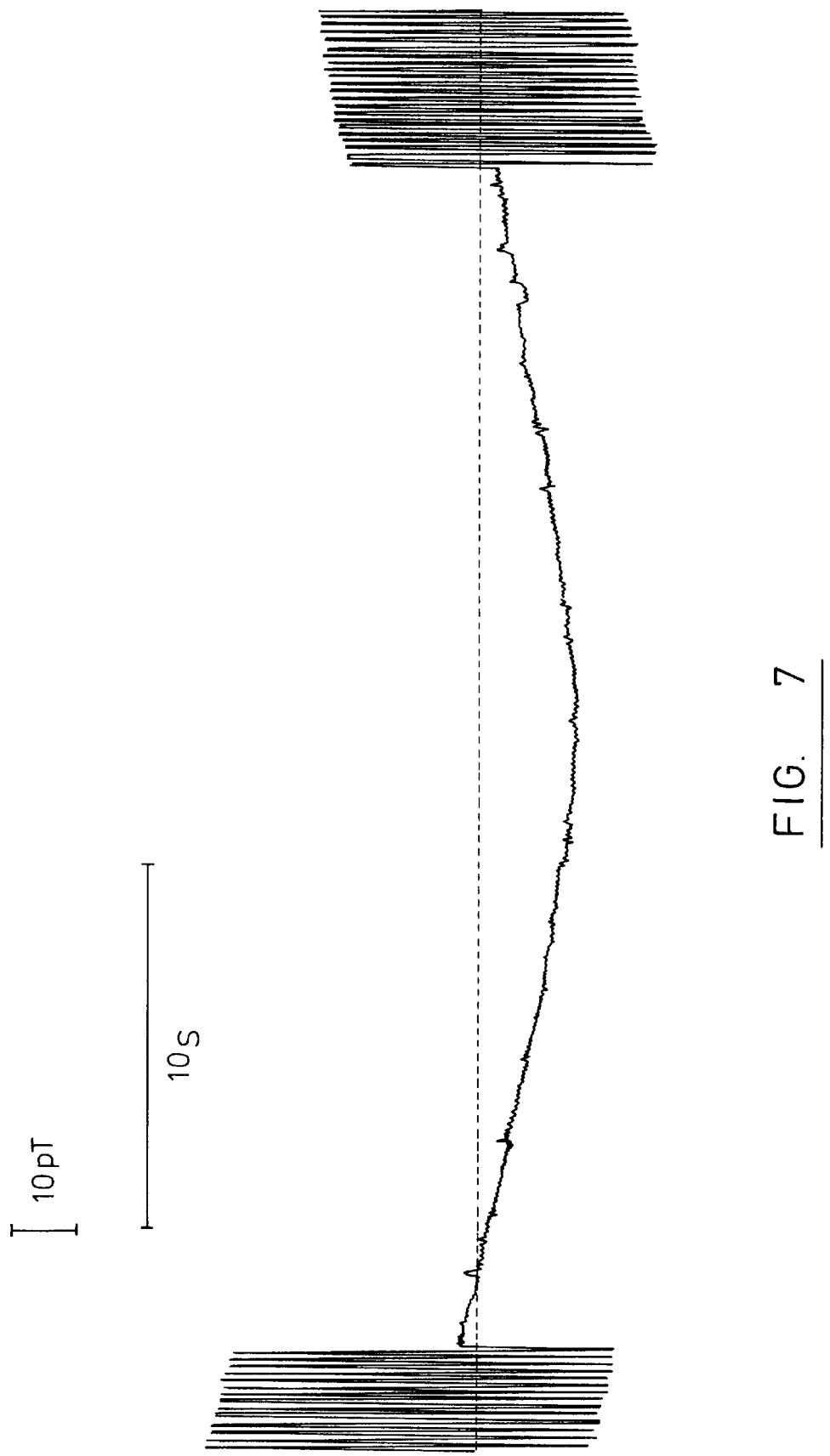

DRILL STRING TELEMETRY

BACKGROUND OF THE INVENTION

The present invention relates to wireless telemetry for drill strings for transmitting data from downhole to the earth's surface.

The problem of improving the data transmission from drill strings whilst drilling has been under investigation for some time, however the increasing drilling depth, especially with directional drilling for oil and gas. The aim is to increase the reliability and rate of transmission of data such as the properties of the formation, navigation and condition of the bore-tool etc.

Among presently used wireless communication techniques such as mud-pulse, acoustic and electromagnetic, the latter is the most promising in terms of its potential for measurement whilst drilling purposes. Typically, known electromagnetic drill string telemetry transmitters comprise a low-frequency radio transmitter located adjacent the drill bit. Data obtained from transducers in the drill bit are first digitised and then transmitted from the borehole to the earth's surface through the rock formation. The signal is then detected and decoded by a receiver placed on the earth's surface, adjacent the rig site. In the frequency range of 2.5–50 Hz, this technique is capable of receiving data from a depth of 5000 meters.

The electromagnetic signal is transmitted in either one of two ways. British Patent No. GB 2,142,804 discloses one way in which the data is modulated onto a pulse code electric signal, which is injected by a current dipole into the rock formation surrounding the borehole bottom area. At the earth's surface the electromagnetic signal generated by the current is detected, and the data is extracted by demodulation. In the described case the rock formation itself is an electrically conductive medium for the signal from the current dipole, which comprises two electrically insulated elements acting as electrodes. It is evident that the signal amplitude will strongly depend on the electrical conductivity properties of rock formation.

We have found that a disadvantage of this current dipole arrangement is that the magnetic field radiated from the current dipole extends substantially radially from the drill string and thus little magnetic signal can be detected at the earth's surface, when the portion drill string containing the transmitter is vertically orientated.

Another disadvantage of known current dipoles is that it is difficult to inject sufficient current into rock types, such as dolomite, which have a high resistivity value.

U.S. Pat. No. 4,800,385 discloses a second way in which the data is modulated onto a signal, which is applied to magnetic dipole in the form of a coil placed adjacent the outer surface of the drill pipe. The magnetic dipole is electrically insulated both from the pipe itself and, on the outside, from drilling mud and is connected to an electrical power source.

We have found that a disadvantage of this magnetic dipole arrangement is that the magnetic field radiated from the dipole decreases with inverse cube of the distance from the transmitter and therefore diminishes to immeasurably small values at large distances. The above-mentioned magnetic dipole transmitter offers a solution which is independent of the conductivity of formation at the location of the transmitter. In this case it is possible to achieve a larger magnetic signal at shorter drilling depths. Therefore, for the initial stages of drilling (i.e. shorter transmission distances and vertical orientation of magnetic transmitter) the magnetic dipole is preferable to the current dipole. However, for drilling depths over 2 km the signal produced by the magnetic dipole source is too small for simple magnetometric detection.

The power consumption and the mass of the current dipole is much less than those of the magnetic dipole. The current dipole source has a simpler construction and therefore is more economical.

Therefore in both said methods of magnetic field generation, the data at the earth's surface is often undetectable or weak depending on the resistivity and/or orientation of the portion of the drill string containing the transmitter.

Magnetic telemetry transmitters operate under extreme conditions, high mechanical loads, contact with corrosive and abrasive materials, and elevated temperatures. Furthermore, the cross-sectional dimensions of the transmitter is limited by the size of the borehole.

The examination of the technical art shows a trend of improvement in transmitter construction, in the first place oriented towards improving the quality of the data transmitted from the borehole bottom. This concerns the increase in the power of the emitted signals in order to compensate for the inherent signal attenuation in the conductive media of the formation. Moreover, in deep drilling and especially in directional drilling for oil and gas, the drill traverses many layers with variable conductive and dielectric properties and the resistivity of clay layers over hydrocarbon deposits can change by more than 100%. This may alter the amplitude of the measured telemetry signal by superimposing on it a noise component thereby complicating the decoding of the telemetry signals.

SUMMARY OF THE PRESENT INVENTION

We have now devised a method of transmitting an electromagnetic signal comprising data obtained from at least one transducer situated in a drill string and a drill string telemetry transmitter therefor.

In accordance with this invention there is provided a method of transmitting an electromagnetic signal containing data obtained from at least one transducer situated in a drill string, the method comprising adaptively controlling the power output by magnetic and current dipoles of a transmitter located in a portion of the drill string, according to the orientation of said portion of the drill string and according to the electrical resistivity of the medium surrounding said portion of the drill string.

The present invention is partly based on the realisation that a current dipole transmitter is unsuitable for use when drilling vertically and when drilling through high resistivity rock formations, and partly based on the realisation that the magnetic field radiated by a magnetic dipole transmitter diminishes very quickly with distance and thus is unsuitable for use when drilling at larger depths. The transmitter of the present invention thus combines a current dipole and a magnetic dipole source, wherein electrical power can be adaptively distributed between these two sources, according to the orientation of the drilling and the properties of the formation, in order to establish optimised and reliable reception of data at the earth's surface.

The transmitter is formed by current and magnetic dipole sources, which can be operated independently or simultaneously, in order to create a distribution of combined magnetic fields with a predominance of the azimuthal component.

The magnetic telemetry transmitter forms a part of the drill string, preferably with its housing elements made of non-ferromagnetic electrically conductive material, and with at least one section of electrical insulation separating the two conductive parts of the transmitter.

The transmitter consists of combined current and magnetic dipoles, wherein the electrodes of the current dipole are capable of injecting electrical currents into the surrounding formation. The magnetic dipole unit consists of a number of coils having ferromagnetic cores preferably in the shape of elongated bars, placed in parallel to the longitudinal axis of the transmitter in a cylindrical cavity inside the transmitter housing. The electrodes of the current dipole and the coils of the magnetic dipole are connected to the power source via an adaptive power control switch.

The said method of magnetic field generation by the use of a combined source of the magnetic field leads to an improved telemetry technique, in that the magnetic signal from this transmitter can be detected at any orientation of the drilling and is much less effected by the variations in the conductivity of formation at the location of the transmitter.

Moreover, the extreme environmental conditions of the transmitter (considerable mechanical strains, vibration, high temperatures and pressures) imply strict requirements for the reliability of construction. It is a feature of the said transmitter, that there is a degree of redundancy (a) between the magnetic dipole and the current dipole, and (b) within the magnetic dipole itself in that it is formed by several emitters connected in parallel so that damage to the windings of one of them does not disrupt the operation of the device as a whole.

Preferably, the power output by the magnetic dipole is increased when the portion of the drill string containing the transmitter is at or adjacent a vertical orientation.

Preferably, the power output by the magnetic dipole is increased when the resistivity of the medium surrounding the portion of the drill string containing the transmitter is above a predetermined value.

Preferably, the power output by the current dipole is reduced or inhibited when the power output by the magnetic dipole is increased.

Preferably, the power output by the current dipole is increased when the portion of the drill string containing the transmitter is at or adjacent a horizontal orientation.

Preferably, the power output by the current dipole is increased when the resistivity of the medium surrounding the portion of the drill string containing the transmitter is below a predetermined value.

Preferably, the power output by the magnetic dipole is reduced or inhibited when the power output by the current dipole is increased.

In one embodiment, the power output by said electric dipole and magnetic dipole sources are controlled from the earth's surface by transmitting a control current to the transmitter, according to data which is received from the transmitter concerning its orientation and the resistivity of its surrounding drilling medium.

In an alternative embodiment, the orientation of the portion of the drill string and the electrical resistivity of the medium surrounding said portion of the drill string are detected by the transmitter, which is then arranged to adaptively control the power output by said magnetic and current dipoles, according to the sensed orientation and resistivity values. Also, in accordance with this invention there is provided a drill string telemetry transmitter located in a portion of the drill string, the transmitter comprising a input for receiving data obtained from at least one transducer arranged to sense a parameter of the drill string and/or a parameter of the surrounding medium, a magnetic dipole arranged to transmit an electromagnetic signal comprising said data, a current dipole arranged to transmit an electromagnetic signal comprising said data and control means for adaptively varying the power output from said magnetic and current dipoles, so as to alter their respective output signals, according to the orientation of said portion of the drill string and according to the electrical resistivity of the medium surrounding said portion of the drill string.

In one embodiment, the transmitter preferably comprises a sensor for sensing the orientation of said portion of the drill string, said control means being arranged to adaptively vary the power applied to said magnetic and current dipoles according to an output of said orientation sensor.

Preferably the transmitter also comprises a sensor for sensing the electrical resistivity of the medium surrounding said portion of the drill string, said control means being arranged to adaptively vary the power applied to said magnetic and current dipoles according to an output of said resistivity sensor.

In an alternative embodiment, the control means is arranged to adaptively vary the power applied to said magnetic and current dipoles according to a control signal received from the earth's surface.

In one embodiment, the transmitter is located adjacent the measurement transducer(s), with the input of the transmitter being connected to an output of the transducer(s).

In an alternative embodiment, the input of the transmitter is connected to a receiver, which receives signals from a remote transmitter having an input connected to said transducer(s). In this manner a relay link can be provided along the drill string from the transducer to the earth's surface.

The remote transmitter may transmit signals along the drill string to the adaptive transmitter. Alternatively, the remote transmitter may itself also comprise an adaptive transmitter.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which:

FIG. 7 is a graph of experimental data obtained with scaled-down model of the drill string telemetry transmitter of FIG. 1.

DETAILED DESCRIPTION OF THE PREFERRED EMBODIMENT

Figure 1:
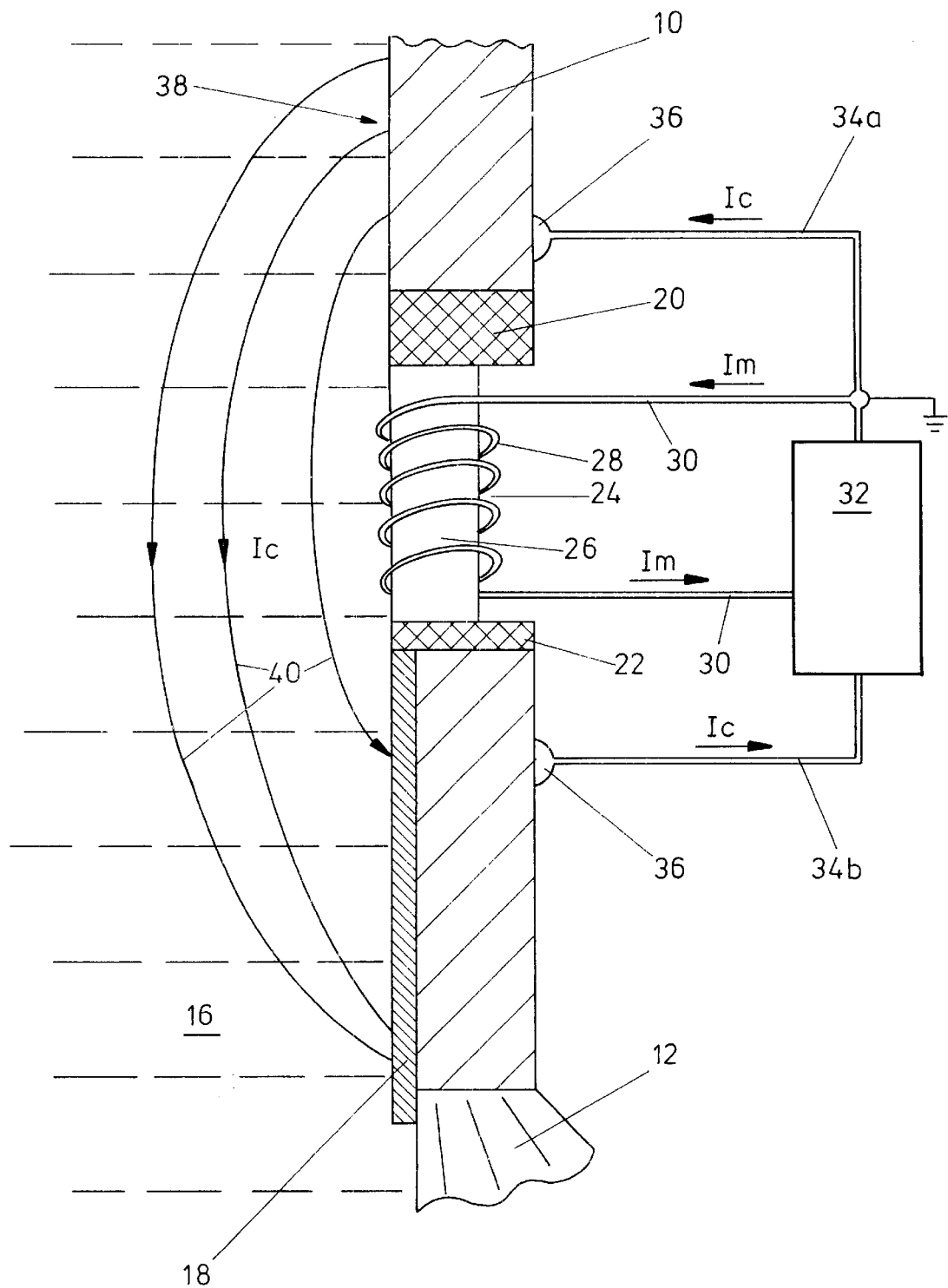
FIG. 1 is a block diagram view of a drill string incorporating a telemetry transmitter in accordance with this invention.

Referring to FIG. 1 of the drawings, the telemetry transmitter of the present invention is disposed between upper and lower sections 10 and 14 of a drill string. A drill bit 12 is connected to the lower end of the lower drill string section 14. The whole outer surface of the drill string is in good electrical contact with the surrounding rock formation 16.

A magnetic dipole 24 is connected via respective elements 20, 22 to the upper and lower sections 10, 14 of the drill string. The magnetic dipole 24 comprises a ferromagnetic core 26 which extends axially of the drill string and which is surrounded by electrically conductive windings 28. The windings 28 are connected via conductors 30 to a power source 32. The power source 32 provides an electrical current which is modulated by the data that is to be transmitted to the earth surface by means of the electromagnetic field. The power source is connected by leads 34a, 34b to the upper and lower drill string sections 10 and 14 respectively, so that the upper and lower drill string sections 10 and 14 form respective electrodes of a current dipole 38. The magnetic dipole 24 and the current dipole 38 can be operated separately and independently, or simultaneously as required.

The electrical current $1_c$ (40 on FIG. 1) flowing the wires 34a, 34b to respective electrodes of the current dipole 38, increases proportionally to the electrical conductivity of the formation. With a constant electrical power P at the output of the power source 32, the electrical current $I_m$ flowing through the winding 28 of the magnetic dipole 24 is inversely proportional to $I_C$, when the magnetic dipoles 24 and current dipole 38 are connected in parallel as shown.

Figure 2:
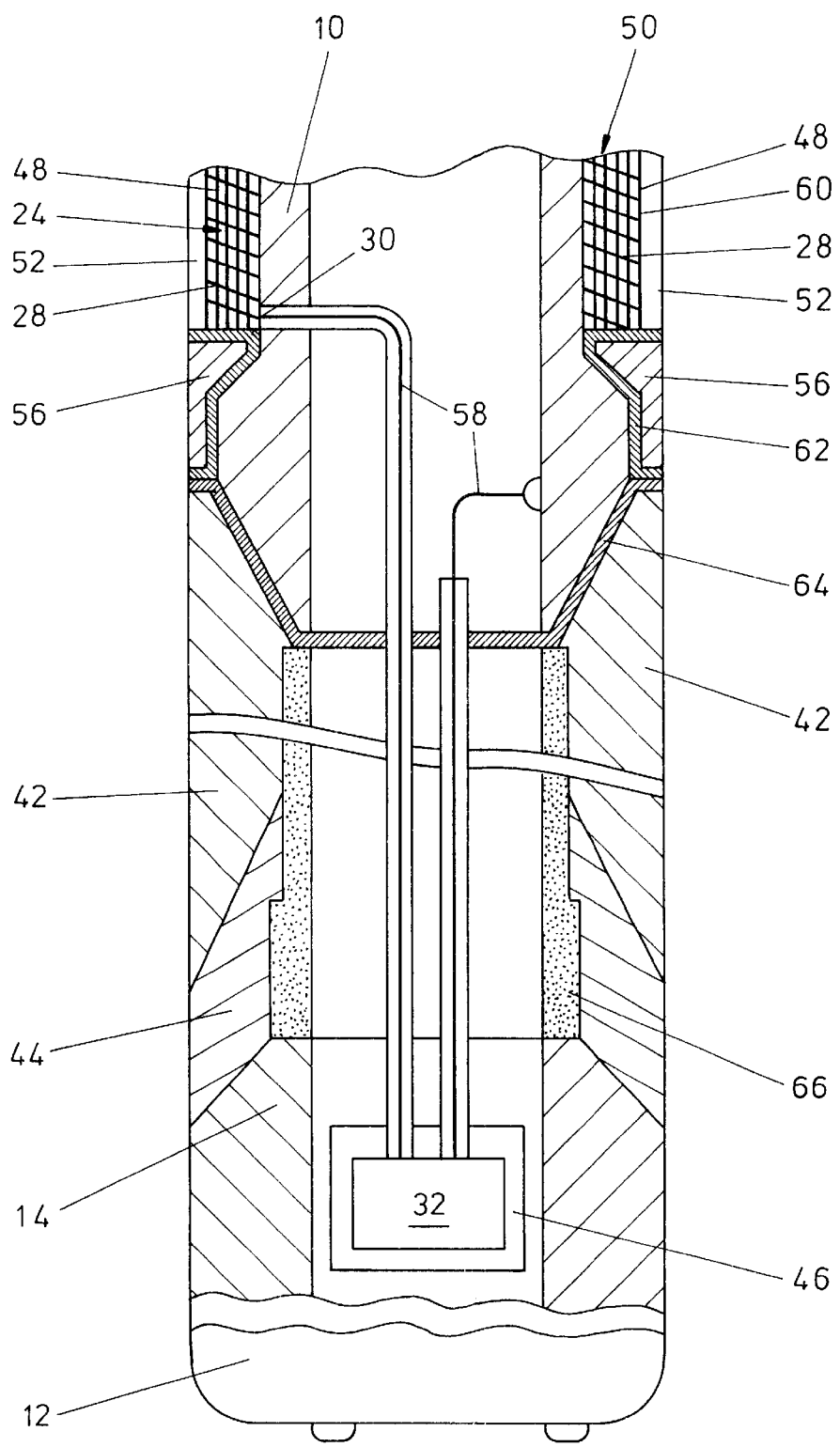
FIG. 2 is a longitudinal section through the telemetry transmitter of FIG. 1.

Referring to FIG. 2 of the drawings, there is shown a detailed representation of the telemetry transmitter of FIG. 1. The upper section of the drill string is attached to the lower section of the drill string 14 by means of couplings 42, 44. The drill bit 12 is attached to the lower end of the lower drill string section 14. The power source 32 and other equipment (not shown) for measuring various parameters of the drill string and the surrounding rock formation are located in an enclosure 46 formed inside the lower drill string section 14. The telemetry sensors are connected to the instrument transducers to enable the coding of the telemetry data by modulating the electrical current produced by the power source 32. In one mode of operation, the transmitter can be controlled from the surface by electrical current feedback via the drill string itself. This feedback current is detected by sensors, such as a potentiometer connected to the electrodes of the current dipole 38.

A magnetic dipole 24 comprises a set of rectangular-sectioned bars 48, which extend axially along the outer surface of the upper drill string section 10. The number of these bars 48 may vary but typically it is envisaged that there may be between 10 and 20 bars. In order to perform the function of an electromagnetic transmitter, windings 28 are wound around each separate bar 48, therefore each bar 48 forms a magnetic dipole 24. The dipoles 24 are covered by protective shields 52 along their entire length, in order to prevent the ingress of mud and water and to prevent mechanical damage. Each of the shields consists of a set of separated sections about 0.3 to 1 meter in length, with electrically insulated internal and external surfaces. The total length of the shields is 10 meters or more. Insulation of the shields 52 are also needed to reduce any current losses and to prevent them shorting out the coil windings 28.

In order to prevent the de-magnetisation effects, the ends of the bars are in close contact with the shaped coupling 56, which is made from soft magnetic material and which, in essence, performs the function of the pole piece. In order to reduce magnetic losses, the elements 10 and 52 are made of non-magnetic stainless steel. Elements 42 and 44 are made of magnetic steel, in order to extend the effective length of the ferromagnetic material of the bars 48 and thereby reduce the power consumption of the transmitter.

Current from the power source 32 is applied via leads 58 to the lower terminals 30 of the coil windings 28. The upper terminal leads of each winding 28 (not shown) are connected to the upper portion of the drill string, thereby enabling all of the magnetic dipoles 28 to be energised in parallel.

The upper portion of the drill string 10 performs the function of the upper electrode of the current dipole 38, as hereinbefore described. The inner surface of the shields 52 and the inner outer surfaces of the coupling elements 56, 42 are covered with coatings of electrically insulating material 62. There is also an intermediate section 66, which is made of non-conductive material and thus there is no electrical contact between the upper and lower drill string sections 10, 14. Electrical contact exists between the outer surface of the transmitter and the rock formation 16, the degree of this contact improves in the presence of water-based drilling mud. In practice, the length of the lower drill string section 10 is about 10 meters or more.

Figure 3:
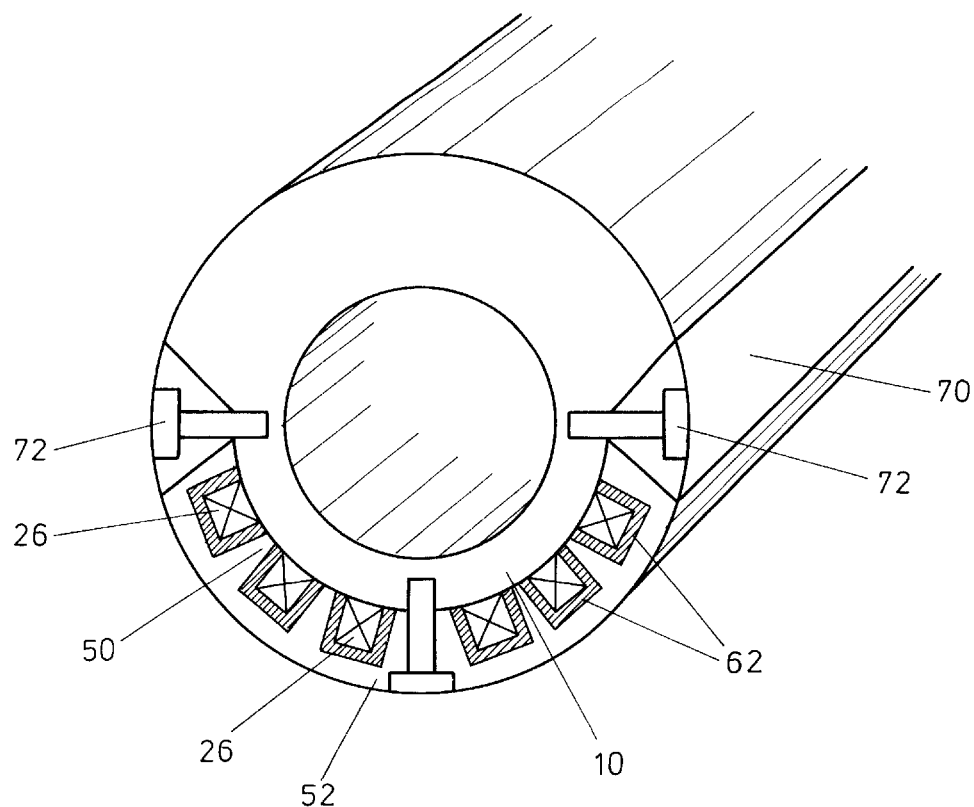
FIG. 3 is a cross-section through the drill string telemetry transmitter of FIG. 1.

Referring to FIG. 3 of the drawings, the coils of the magnetic dipoles are rigidly connected to the shields 52 by means of an electrically insulating material 62, such as a polymeric sealing compound. The assembly comprising magnetic dipoles are held in place around the periphery of the upper drill string section and by means of wedge-shaped clamps 70. The bolts 72 holding the clamps in place are electrically insulated from the clamps 70 and the shields 52.

Figure 4:
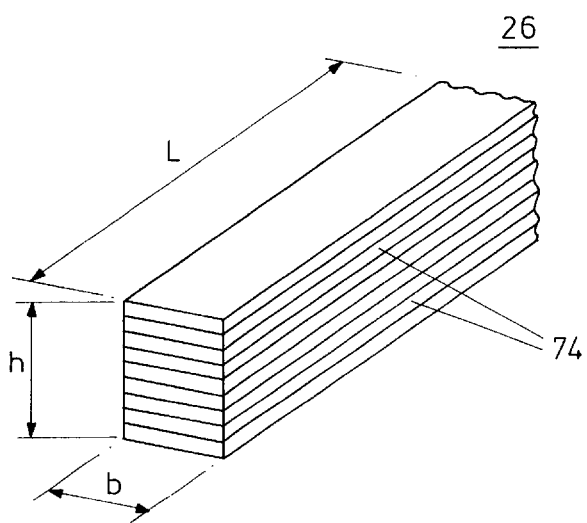
FIG. 4 is a diagram of the magnetic dipole core assembly of the telemetry transmitter of FIG. 1.

Referring to FIG. 4 of the drawings, the core of the magnetic dipole bars comprises a stack of laminated sheets 74 of transformer steel, which are electrically insulated from each other. The stack has a width "B", height "H" and length "L". The material of the sheets 74 is selected to provide high saturation magnetisation, high permeability, low specific losses, low magnetostriction and low cost. Electrical steel such as the type used in large power transformers is a suitable material, which satisfies all of the above-mentioned requirements: saturation magnetisation up to 2T, permeability 30,000–40,000, total losses as less than 1 W/kg at 50 Hz frequency.

Figure 5:
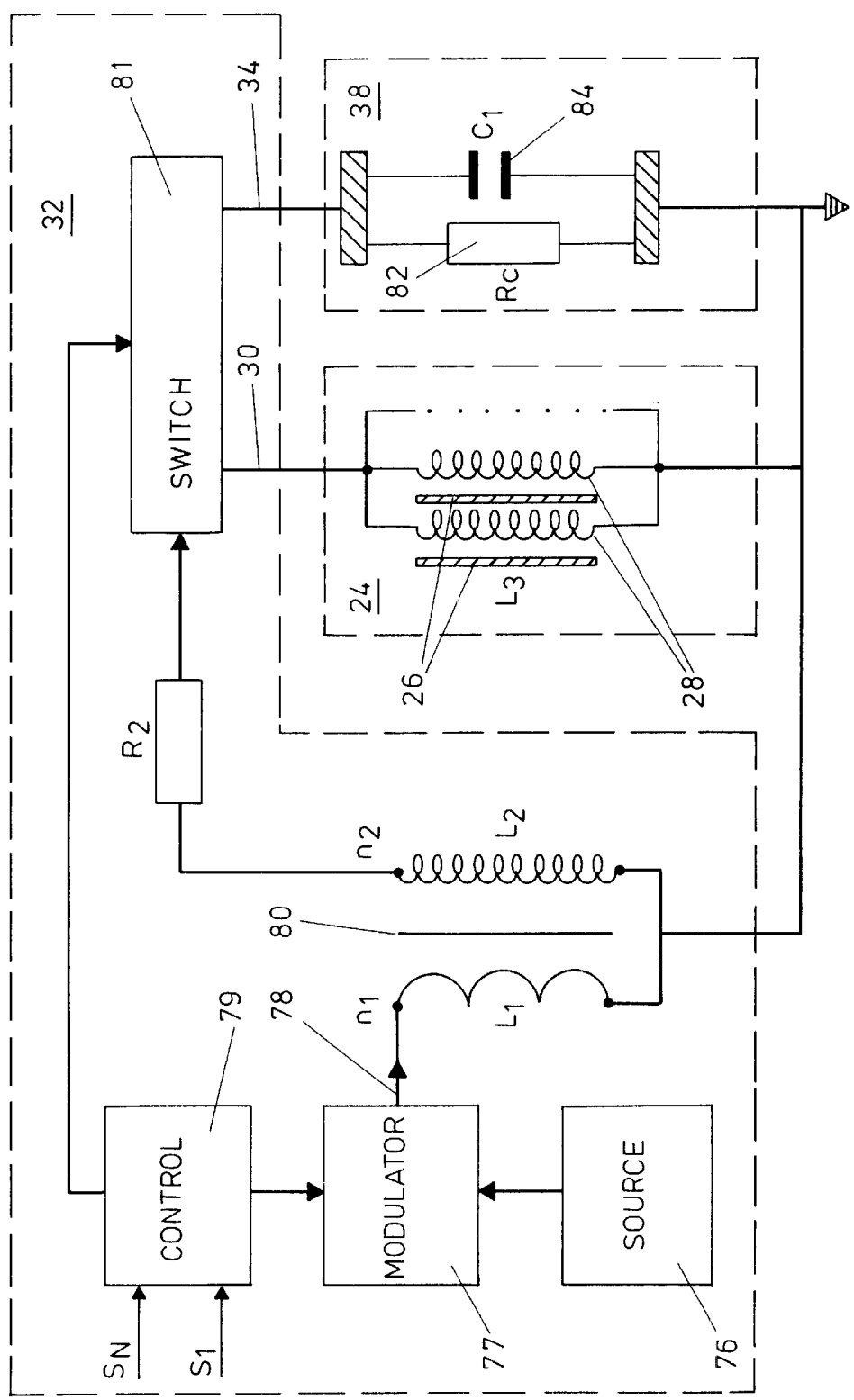
FIG. 5 is a circuit diagram of the telemetry transmitter of FIG. 1.

Referring to FIG. 5 of the drawings, there is shown the circuit diagram of the telemetry transmitter. The power supply 32 includes a turbine generator or a battery pack 76 connected to a modulator 77, which outputs a pulsed output signal having an amplitude U on its output 78. The modulation is controlled by a control circuit 79 according to the telemetry data, which is received from the various sensors (not shown). The output of the modulator 77 is connected to a step up transformer 80 having n1 turns on its primary winding L1 and n2 turns on its secondary winding L2 and resistance R2.

Magnetic and current dipoles 24, 38 are selected via switch 81, which is controlled by the control circuit 79. This circuit has a number of inputs S1 . . . SN according to the number of sensors used to monitor the drilling process, environmental parameters, as well as the control signal transmitted from the earth surface to control the telemetry transmitter parameters. A receiver arranged to receive the control signal from the earth's surface contains both magnetic and current sensors and it is possible to control the power that is output from the magnetic or current dipoles 24, 38 independently or simultaneously. In the latter case, the switch 81 connects the conductors 30 and 34 in parallel. The transmitter also comprises sensors (not shown) for sensing the orientation of the transmitter and for sensing the resistivity of the surrounding rock formation. The switch 81 is thus able to automatically control the power that is output by the magnetic and current dipoles 24, 28, either automatically by means of the sensors (not shown) or by means of control signals from the earth surface.

The windings 28 of each magnetic dipole 24 are connected in parallel. The effective resistance $R_c$ and capacitance $C_1$ between the electrodes 10, 14 of the current dipole 38 form an impedance Z which determines the magnitude of the current $I_c$ (and therefore the magnitude of the magnetic field). This impedance Z depends on the electric and the dielectric properties of the surrounding formation.

Figure 6:
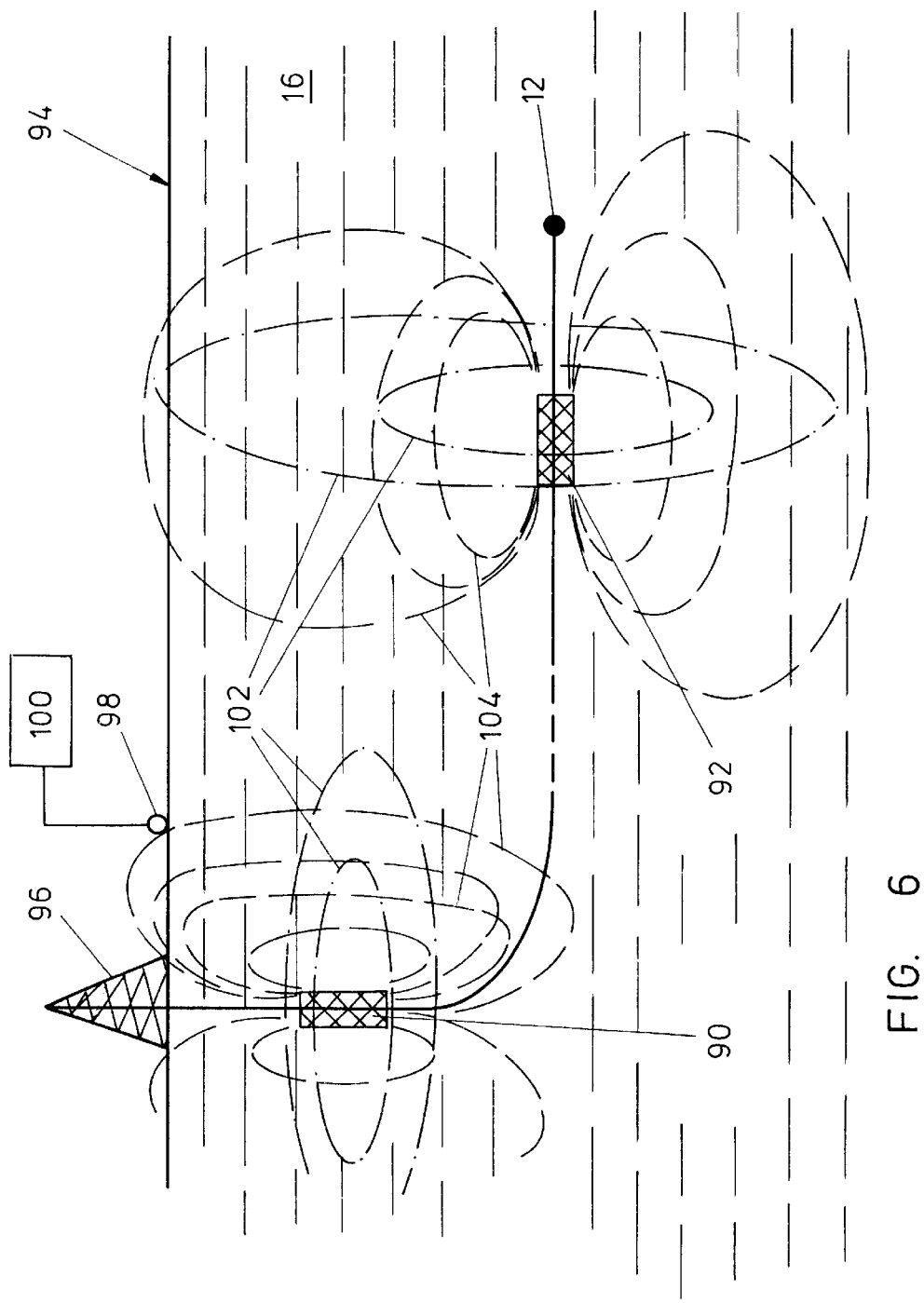
FIG. 6 is a sectional view through the earth's crust, showing the magnetic fields radiated from the drill string telemetry transmitter of FIG. 1, at different drilling orientations.

Referring to FIG. 6 of the drawings, during directional drilling for oil and/or gas the drill string can be directed both horizontally and vertically, in accordance with known techniques.

In the vertical position 90, it can be seen that the lines of flux 104 radiating from the magnetic dipole 24 extend substantially axially of the drill string, whereas the lines of flux from the current dipole 38 extends substantially radially of the drill string. Thus, it will be appreciated that in the vertical position 90 the signal received at the earth surface 94 is predominantly provided by the magnetic dipole 24.

However, in the horizontal position 92 the magnitude of the signal received from the current dipole 38 is larger than the signal received from the magnetic dipole 24. The drawings of the magnetic field lines have a qualitative character and do not take into account any distortions due to the present ferromagnetic masses or variations in the electrophysical or characteristics of the rock etc., as well as in any variations in the conductivity of the drilling mud, which is usually water or oil based.

The magnetic fields are detected at the earth's surface 94 by a magnetometer connected to a processor 100. If necessary, in one mode of operation, control signals can be sent back down to the transmitter in the drill string, in order to adaptively vary the power output by the magnetic or current dipoles 24, 38, according to data which is received from the transmitter containing details of its orientation and the resistivity of the surrounding rock formation 16.

It should be noted that the magnetic field received from the transmitter decreases with distance (r) from the transmitter axis as $1/r^3$ for the magnetic dipole and as $1/r^2$ for the current dipole 38.

The analysis and modelling conducted with the Telemetry transmitter prototypes have clarified a number of points. The magnitude of the magnetic signal, transmitted by Telemetry transmitter in the first stage of vertical orientation (90 on FIG. 6) is determined mainly by the magnetic dipole source part and can be expressed as:

$$B_a = M/2\pi r^3 [Wb/m^2] \quad (1)$$

where M is the total magnetic moment of the magnetic dipole, and r is the distance from the source. The magnetic moment of a uniformly magnetised body is the product of its volume and the magnetic induction within this volume:

$$M = VB \, [Wb.m] \quad (2)$$

where V is the volume of the magnetised object and B is the value of magnetic induction inside magnetised matter.

Therefore, in order to maximise the magnetic field at a given distance from the magnetic transmitter one has to maximise its magnetic moment, which means the largest possible volume of the material should be magnetised at the maximum possible magnetisation. The value of the magnetisation depends on the permeability of the magnetised material and the externally applied magnetising field:

$$B = \mu_o \mu H \quad (3)$$

where $\mu_o$ is the permeability of free space, $\mu$ is the permeability of the magnetised material and H is the applied magnetic field intensity. This external magnetising field is usually created by applying an electric current to a solenoid e.g. wound from copper wire. The magnetic field within a solenoid carrying a current I is given by:

$$B = \mu_o \mu NI/L \quad (4)$$

where N is the number of turns and L is the length of the solenoid. Clearly this magnetising field depends only on the amplitude of the current and the number of turns in the coil.

Magnetisation depends not only on the nature of the magnetised material but also on its shape, with the 'effective' permeability of a magnetised object being given by:

$$\mu_{\textit{eff}} = \mu/(1 + n(\mu - 1)) \quad (5)$$

where n is the so-called 'demagnetisation factor'.

The general rule is that the larger the length to diameter ratio of an object the easier it is to magnetise. The analytical solution for the demagnetisation factor of a long ellipsoidal body is:

$$n = ((1 - e^2)/e^3) \, (\text{Tan } h^{-1}(e) - e) \quad (6)$$

where $e = (1 - b^2/a^2)^{-\frac{1}{2}}$ with a and b being the long and short half-axes of the ellipsoid respectively.

For horizontal orientation of the Telemetry transmitter the magnetic signal on the surface is a sum of magnetic dipole and current dipole partial contributions:

$$B_\theta = M/4\pi r^3 + (\mu_o/4\pi)(Id/r^2), \quad (7)$$

where I is the current, d is the physical length of the current dipole.

The experimental verification of the Telemetry transmitter performance has been carried out by the use of sensitive cryogenic magnetometers under typical environmental noise (see FIG. 7). Measurements were performed with the Telemetry transmitter model (magnetic and current dipoles) of the following design:

a: length of magnetic dipole part—2.4 m b: dimensions of the magnetised rods (a total of 12)—5× 3.5×2400 mm placed around stress bearing stainless tube—30 mm diameter c: effective permeability of the rods—2000 (measured at 1.5 T magnetisation) d: Magnetising solenoid coils— 3000 turns/m, 0.27 mm diameter copper wire, each coil having a resistance of 40 Ω and measured inductance (in assembly) of 300 mH.

e: each current dipole electrode consists of 3 buried copper tubes of 20 mm diameter and 0.5 m length connected in parallel f. length of the current dipole 20 m.

g: power source 12 V, 10 A generating rectangular signal at 1–500 Hz with or without phase reversal.

The magnetic moment for the magnetic dipole part of the model Telemetry transmitter source was measured to be $7 \times 10^{-4}$ Wb.m: This source produced a 56 pT peak-to-peak magnetic field signal at 5 Hz frequency and at a distance of 100 m, which was detected by a cryogenic magnetometer as illustrated in FIG. 7 (left hand side). Full size magnetic dipole can be 5 times bigger and have 125 times larger magnetic moment and therefore capable of data transmission over 3000 m. The current dipole part of the model Telemetry transmitter injected a current of 200 mA peak-to-peak generating a signal of 45 pT at a distance of 100 m as shown in FIG. 7 (right hand side). A current dipole with effective length of a hundred meters formed by the drill string can inject currents of the order of 1 A for a wide range of the conductivity of formation and therefore will provide similar or longer transmission distances compared with the magnetic dipole part. The combined Telemetry transmitter can provide sufficient signal levels for magnetic telemetry at any orientation of the transmitter.

The cited test measurements were specially designed for the evaluation of data telemetry from the drilling tool through formation. However, the Telemetry transmitter can be used for data transmission in other applications, for example in remote monitoring of cased and uncased wells e.g. using traditional electrical well logging sonde (U.S. Pat. No. 3,973,188, ATTALI, issued Mar. 8, 1976), for underwater exploration (U.S. Pat. No. 3,052,836, POSTMA, issued Apr. 9, 1962), for acoustic and magnetic well logging, for localisation and navigation of downhole objects from the earth's surface and controlled-source electromagnetic prospecting. In other words, the essence of the invention to be patented does not change if the Telemetry transmitter is used as a transmitter of different information.

While the preferred embodiment(s) of the invention have been shown and described, it will be apparent to those skilled in the art that changes and modifications may be made therein without departing from the spirit of the invention, the scope of which is defined by the appended claims.

What is claimed is:

1. A method of transmitting an electromagnetic signal containing data obtained from at least one transducer in a drill string, the method comprising:
    sensing the orientation of the drill string and/or the electrical resistivity of the medium surrounding the portion of the drill string containing a transmitter and outputting a signal;
    supplying power to the transmitter located in the portion of the drill string, the transmitter containing a magnetic and a current dipole; and
    controlling the power output by the magnetic and the current dipoles to optimize the transmission of data from the transducer based on the signal.

2. A method as claimed in claim 1, increasing the power output by the magnetic dipole when the portion of the drill string containing the transmitter is at or adjacent a vertical orientation.

3. A method as claimed in claim 2, reducing or inhibiting the power output by the current dipole when the power output by the magnetic dipole is increased.

4. A method as claimed in claim 1, increasing the power output by the magnetic dipole when the resistivity of the medium surrounding the portion of the drill string containing the transmitter is above a predetermined value.

5. A method as claimed in claim 4, reducing or inhibiting the power output by the current dipole when the power output by the magnetic dipole is increased.

6. A method as claimed in claim 1, increasing the power output by the current dipole when the portion of the drill string containing the transmitter is at or adjacent a horizontal orientation.

7. A method as claimed in claim 6, reducing or inhibiting the power output by the magnetic dipole when the power output by the current dipole is increased.

8. A method as claimed in claim 1, increasing the power output by the current dipole when the resistivity of the medium surrounding the portion of the drill string containing the transmitter is below a predetermined value.

9. A method as claimed in claim 8, reducing or inhibiting the power output by the magnetic dipole when the power output by the current dipole is increased.

10. A method as claimed in claim 1, controlling the power output by the electric and the magnetic dipoles from a control signal sent to the transmitter from the earth's surface.

11. A drill string telemetry transmitter located in a portion of a drill string, the transmitter comprising an input for receiving data obtained from at least one transducer arranged to sense a parameter of the drill string and/or a parameter of the surrounding medium, a magnetic dipole arranged to transmit an electromagnetic signal comprising said data, a current dipole arranged to transmit an electromagnetic signal comprising said data and control means for adaptively varying the power output by said magnetic and current dipoles, according to the orientation of said portion of the drill string and according to the electrical resistivity of the medium surrounding said portion of the drill string.

12. A drill string telemetry transmitter as claimed in claim 11, comprising a sensor for sensing the orientation of said portion of the drill string, said control means being arranged to adaptively vary the power applied to said magnetic and current dipoles according to an output of said orientation sensor.

13. A drill string telemetry transmitter as claimed in claim 11, comprising a sensor for sensing the electrical resistivity of the medium surrounding said portion of the drill string, said control means being arranged to adaptively vary the power applied to said magnetic and current dipoles according to an output of said resistivity sensor.

14. A drill string telemetry transmitter as claimed in claim 11, wherein said control means is arranged to adaptively vary the power output by said magnetic and current dipoles according to a control signal from the earth's surface.

15. A drill string telemetry transmitter as claimed in claim 11, wherein said input is connected to said transducers.

16. A drill string telemetry transmitter as claimed in claim 11, wherein said input is connected a receiver which receives signals from a remote transmitter having an input connected to said transducers.

17. A drill string telemetry system comprising a first transmitter located in a lower portion of the drill string, said first transmitter comprising an input connected to at least one transducer arranged to sense a parameter of the drill string and/or a parameter of the surrounding medium, said transmitter being arranged to transmit data output from the transducers, a and a second transmitter located in an upper portion of the drill string, said second transmitter comprising a receiver arranged to receive the data transmitted by said first transmitter, a magnetic dipole arranged to transmit an electromagnetic signal comprising said data, a current dipole arranged to transmit an electromagnetic signal comprising said data and control means for adaptively varying the power output from said magnetic and current dipoles, according to the orientation of said upper portion of the drill string and according to the electrical resistivity of the medium surrounding said upper portion of the drill string.

18. A drill string telemetry system as claimed in claim 17, wherein said first transmitter is arranged to transmit a signal carrying said data along the drill string to said receiver in the second transmitter.

19. A drill string telemetry system as claimed in claim 17, wherein said first transmitter comprises a magnetic dipole arranged to transmit an electromagnetic signal comprising said data, a current dipole arranged to transmit an electromagnetic signal comprising said data and control means for adaptively varying the power output from said magnetic and current dipoles, according to the orientation of said lower portion of the drill string and according to the electrical resistivity of the medium surrounding said lower portion of the drill string.

* * * * *